United States Patent
Mucklow et al.

(10) Patent No.: US 9,607,006 B2
(45) Date of Patent: Mar. 28, 2017

(54) TEMPORARY DISTRIBUTED FILE PERSISTENCE

(75) Inventors: Blaine Madison Mucklow, Smyrna, GA (US); Ramon Juan San Andres, Duluth, GA (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 13/267,852

(22) Filed: Oct. 6, 2011

(65) Prior Publication Data

US 2013/0091108 A1    Apr. 11, 2013

(51) Int. Cl.
*G06F 17/30* (2006.01)

(52) U.S. Cl.
CPC .............................. *G06F 17/3023* (2013.01)

(58) Field of Classification Search
CPC ......... G06F 17/30309; G06F 17/30194; G06F 17/3023; G06F 8/71; G06F 12/084; G06F 9/4435; Y10S 707/99954
USPC .......................... 707/695, 652, 694; 717/170
See application file for complete search history.

(56) References Cited

U.S. PATENT DOCUMENTS

| | | | | |
|---|---|---|---|---|
| 5,649,200 A * | 7/1997 | Leblang | ..................... | G06F 8/71 707/999.202 |
| 5,787,280 A * | 7/1998 | Joseph | ................... | G06F 9/4435 707/694 |
| 6,460,052 B1 * | 10/2002 | Thomas | ............ | G06F 17/30309 707/695 |
| 7,707,182 B1 * | 4/2010 | Kee et al. | ...................... | 707/638 |
| 7,950,024 B2 * | 5/2011 | Schmidt | ..................... | G06F 8/71 709/201 |
| 8,266,122 B1 * | 9/2012 | Newcombe | ........ | G06F 17/30309 707/695 |
| 8,856,724 B2 * | 10/2014 | Somani | ..................... | G06F 8/30 717/101 |
| 2003/0009522 A1 * | 1/2003 | Rau et al. | ...................... | 709/205 |
| 2005/0188170 A1 * | 8/2005 | Yamamoto | ................ | G06F 8/65 711/170 |
| 2006/0047716 A1 * | 3/2006 | Keith | ................. | G06F 17/30233 |
| 2006/0288056 A1 * | 12/2006 | Yamakawa | .......... | G06F 17/3023 |
| 2010/0280997 A1 * | 11/2010 | Lillibridge | ........ | G06F 17/30067 707/652 |
| 2012/0259813 A1 * | 10/2012 | Takata et al. | .................. | 707/622 |
| 2013/0086013 A1 * | 4/2013 | Mucklow | ............ | G06F 17/3023 707/695 |
| 2013/0297577 A1 * | 11/2013 | Brown | .............. | G06F 17/30309 707/695 |

* cited by examiner

*Primary Examiner* — Dennis Truong
(74) *Attorney, Agent, or Firm* — Parks IP Law LLC; Stephen J. Terrell

(57) ABSTRACT

A system includes a first computer hosting a version control system, the version control system providing a version control system repository configured to store one or more temporary files, wherein the version control system repository is configured to allow concurrent access of the temporary files by a plurality of computers or computer processes. Also the version control system repository is deleted by the first computer or by one of the plurality of computers or computer processes when the temporary files are no longer needed.

14 Claims, 2 Drawing Sheets

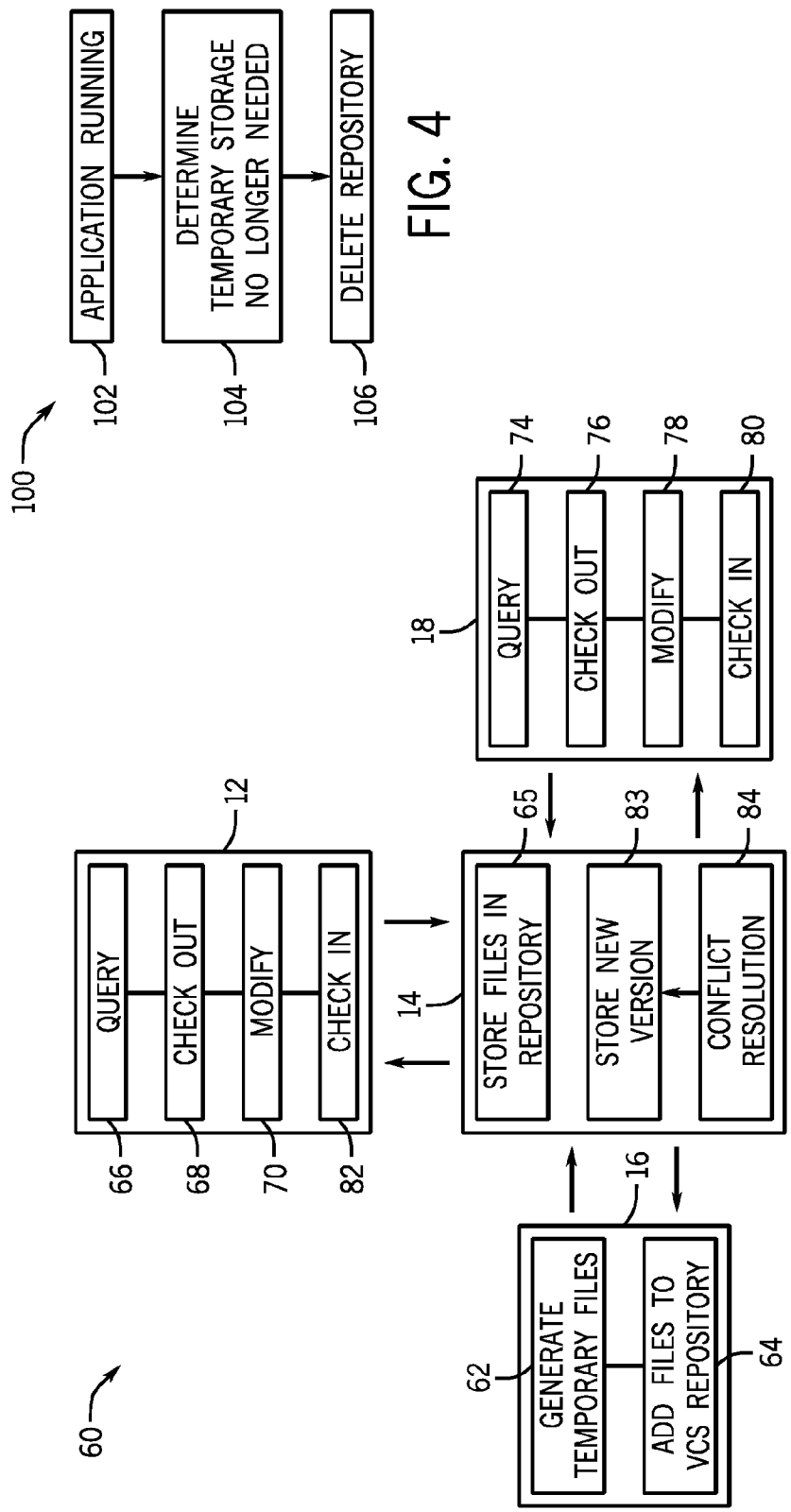

TEMPORARY DISTRIBUTED FILE PERSISTENCE

BACKGROUND OF THE INVENTION

The subject matter disclosed herein relates to distributed computer systems, and more specifically, distributed computer systems that utilize a version control system (VCS) to temporarily distribute files that frequently change to clients of the distributed computer systems.

Distributed computer systems consist of multiple autonomous computers that communicate through a computer network. The computers interact with each other to achieve a common goal. Many such distributed systems include distributed programs that are configured to run in the distributed computer system. One such example of a distributed computer program may be a model versioning manager (MVM).

An MVM is a software application that maintains a representation (model) of a system (e.g., a power distribution network). Updates to the model may be submitted via multiple clients (e.g., computers and/or processes) in a distributed network. The updates are sent in the form of jobs containing additions/deletions/modifications to the model. The MVM maintains the current state of the model as well as the historical changes that have taken place over time. The MVM system can thus provide the version of the entire model as it existed at a particular point in time. The MVM allows the exporting of a model version as a baseline (containing a snapshot of the model at a particular point) or as increments (which are applied to a particular version to bring the model to a new version). With increased numbers of clients present in distributed computer systems, utilization of the distributed programs can increase dramatically. For example, in MVMs the number of model modifications to the models can become quite numerous. Accordingly, the number of temporary files used in the distributed programs may also increase. The clients in the distributed computer system may desire access to these temporary files at the same time. Unfortunately, in many situations, access to the temporary files may only be granted to one client at a time. Further, as additional modifications are made, additional versions are stored creating a need for increased storage capacity.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a first computer hosting a version control system, the version control system providing a version control system repository configured to store one or more temporary files, wherein the version control system repository is configured to allow concurrent access of the temporary files by a plurality of computers or computer processes, and wherein the version control system repository is deleted by the first computer or by one of the plurality of computers or computer processes when the temporary files are no longer needed.

In a second embodiment, a method includes determining, via a computer, a need for a temporary storage space, creating, via the computer, the temporary storage space when there is a need for the temporary storage space, wherein the temporary storage space comprises a version control system repository configured to allow concurrent access to temporary files stored in the version control system repository, determining, via the computer, that the temporary storage space is no longer needed, and deleting, via the computer, the temporary storage space when the temporary storage space is no longer needed.

In a third embodiment, a non-transitory computer readable medium includes computer-readable instructions to access one or more temporary files from a temporary storage space comprising a version control system repository, wherein the temporary files comprise files generated from a computer program for temporary usage, modify one or more of the temporary files, and add the modifications to the version control system repository.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is flow diagram illustrating client interactions with the VCS repository, in accordance with an embodiment; and FIG. 4 is a flow diagram of a method of removing the repository of FIG. 2, in accordance with an embodiment.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Further, the term "client" may refer to a computer (e.g., a processor and storage that allows execution and storage of machine-readable instructions to provide the functionality described herein) and/or computer processes running on such computers.

Present embodiments relate to distributed computer systems that use a version control system (VCS) to implement a concurrent temporary distribution of files to a plurality of clients (e.g., computers and/or computer processes running on computers) in a distributed system. The use of a VCS repository for the distribution of temporary files allows multiple clients to concurrently access and/or modify the files without conflicting issues. Typical VCS repositories are highly persistent systems that do not allow easy removal of generated files. However, embodiments of the current invention use a modified VCS scheme to allow deletion of the generated files when they are no longer needed.

Figure 1:
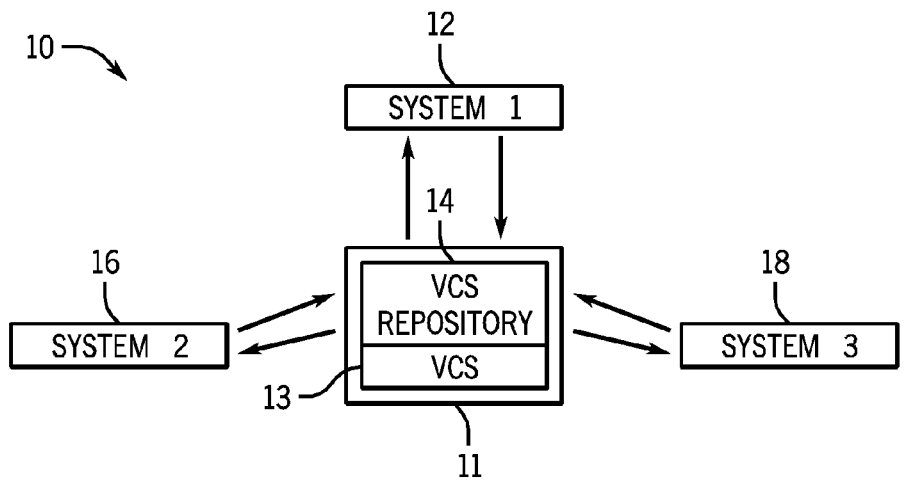
FIG. 1 is a block diagram of an embodiment of a distributed computer system utilizing a VCS repository for temporary files, in accordance with an embodiment.

With the foregoing in mind, FIG. 1 represents a distributed computer system 10 that includes a temporary file distribution scheme using a VCS repository. Many distributed computer systems 10 generate temporary files useful to clients of the distributed system. Typically, these temporary files are distributed through traditional file systems that may result in inefficient and sometimes erroneous results. For example, many typical file systems place access locks on files that are currently in use by other clients. Additional clients that desire to access the locked files must wait for the file access to be unlocked (e.g., wait for the file access to be freed up). Further, these files may be modified by numerous clients over time, generating many file modifications and file versions. Over time, on a standard file distribution system, these numerous modifications to the temporary files may result in data corruption issues because traditional file distribution systems may not be configured to efficiently and/or effectively support file versioning and persistence of modified files.

To counteract these issues, a distributed computer system 10 includes a computer 11. Computer 11 may include a processor and storage that allow for the execution and storage of machine-readable instructions to perform the various processes described herein. For example, computer 11 hosts a version control system (VCS) 13 in internal or externally attached storage. The VCS 13 may store a temporary VCS repository 14. Through use of the temporary VCS repository 14, the distributed computer system 10 may distribute files to and/or from clients 12, 16 and 18. As will be discussed in more detail below, regarding FIGS. 2-4, VCS repositories include enhanced functionality relating to file distribution among various clients. The VCS repositories may allow multiple clients to access a version of a file at the same time. The VCS repositories may keep track of modifications to files in the repository by generating file versions for each modification made to a file. Further, VCS repositories may more efficiently store modifications of the temporary files in the system 10. For example, in a traditional file system, generating additional versions of a file may entail generating a complete new file with both the modifications and the original data that does not change. When storing the new version, the temporary VCS repository may store only the modified content associated with a new version, thus reducing the amount of utilized storage space. The temporary VCS repository 14 may generate the new file version by comparing the previous version with the modifications stored for the new version.

Figure 2:
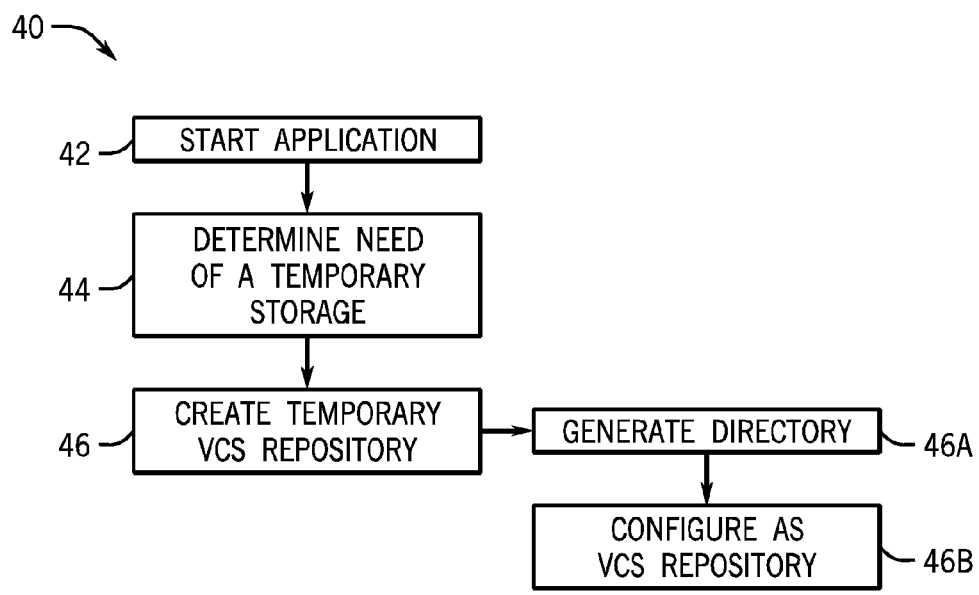
FIG. 2 is a flow diagram of a method of generating a VCS repository for distributing temporary files, in accordance with an embodiment.

FIG. 2 is a flow diagram illustrating a method 40 for creating a temporary VCS repository 14 on the computer 11. Any of the clients 12, 16, and/or 18 or the computer 11 may run an application. The computer or client (e.g., computer 11 and/or clients 12, 16, and/or 18) may include computer-readable instruction stored in storage to start the application (block 42). For example, the application may be a java application that generates and/or uses temporary files in a distributed environment. Thus, a temporary storage space may be needed. In one embodiment, the application may include a modeling version management (MVM) system that models a system while retaining a version history of the model over time. The computer or client (e.g., computer 11 and/or clients 12, 16, and/or 18) that is running the application may include instructions to determine the need for a storage space (block 44) based upon determining that temporary files have been and/or will be generated. Upon determining the need for a temporary storage space (block 44), the temporary VCS repository 14 may be created (block 46). For example, as shown, the computer or client (e.g., computer 11 and/or clients 12, 16, and/or 18) that is running the application may include instructions to generate a directory on computer 11 (block 46A). To avoid conflicts with other VCS repositories that may be created, the directory may be named by a universally unique identifier (UUID). UUIDs are standardized identifiers that allow distributed systems to uniquely identify objects without requiring central coordination. Further, the directory may then be configured as a temporary VCS repository (block 46B).

Once created, computer 11, hosting the VCS that is storing the temporary VCS repository 14, may include instructions that allow concurrent file sharing. For example, these instructions may allow clients to add, check out, modify, and/or check in files to the temporary VCS repository 14. FIG. 3 is a flow diagram 60 illustrating an example of clients interacting in a distributed system for temporary files, in accordance with an embodiment. In the depicted example, client 16 may generate temporary files to be accessed by clients 12, 16, and 18 (block 62). The computer 11 providing the temporary VCS repository 14 includes instructions that allows client 16 to add the generated temporary files in the temporary VCS repository 14 for subsequent access by clients 12, 16, and 18 (block 64). The added files are stored on the computer 11 (or attached storage) in the temporary VCS repository 14 (block 65).

To access files, the clients 12, 16, and 18 may include instructions to query computer 11 for available files in the temporary VCS repository 14 and then check out the files. Upon check out, the files may be viewed and/or modified. For example, client 12 may desire to access the temporary files added by client 16, discussed above. Client 12 may include instructions to query the temporary VCS repository 14 for available files (block 66) to determine which files are needed, and check out the files from the temporary VCS repository 14 (block 68). Upon check out, client 12 may view and/or modify the checked out files (block 70).

Other clients may continue to access the files even when the files are checked out by other clients. For example, while client 12 has the files checked out, client 18 may also request access to the files. Client 18 may query the temporary VCS repository 14 (block 74) to determine which files are needed and check out the files (block 76). Upon checking out, client 18 may view and/or modify the checked out files (block 78).

When clients modifying files in a temporary VCS repository 14 are finished making modifications, the clients may check the files back in (block 80). By checking the files back in, the temporary VCS repository 14 may register the changes, generating a new version of the file based upon the modifications. For example, client 12 may complete modifications to the checked out files, and check the files back in (block 82). Upon check in, the temporary VCS repository 14 may store a new file version based upon the modification made by client 12 (block 83). In some embodiments, the temporary VCS repository 14 may store only the modifications made by client 12. In other embodiments, the temporary VCS repository may 14 store a complete new version of the files based upon the modifications made by client 12.

Under certain circumstances, some files may be checked in based upon a non-current base version of a file. For example, in the flow diagram 60, client 18 may check out the files prior to the new version generated from the modifications checked in by client 12. Upon check in of the files by client 18, the temporary VCS repository 14 may determine that files where changed by client 12 after check out from client 18 and thus the base file version used by client 18 may not be up to date. Thus, the temporary VCS repository 14 may determine what content, if any, should be modified in the client 18 checked in files based upon the checked in changes of client 12. To do this, the temporary VCS repository 14 may provide conflict resolution (block 84).

In some embodiments, the computer 11 hosting the temporary VCS repository 14 may provide conflict resolution by merging the two sets of checked in modifications. For example, under this scheme, the temporary VCS repository 14 may determine the unmodified portions of data from client 18 that were intermediately modified by client 12. The temporary VCS repository 14 may subsequently apply such modifications to the checked in data of client 18.

In alternative embodiments, the computer 11 hosting the temporary VCS repository 14 may provide conflict resolution by keeping the modifications of different clients separate. For example, under this scheme, the temporary VCS repository 14 may simply generate a new version of the files based upon the data provided upon check in by client 18, without making any modifications based upon the checked in files from client 12. Thus, while the files were intermediately updated by client 12, such revisions may not be applied to the file version generated based upon the check in by client 18. Once the conflict resolution is complete, the new version is stored in the temporary VCS repository 14 (block 83). One benefit of keeping the modified versions separate may be that clients may modify data without having to be concerned about modifications made by other clients.

Eventually, the temporary files may no longer be needed. Accordingly, the temporary VCS repository 14 may no longer be needed. As previously discussed, clients that allow a multitude of modifications may utilize a vast amount of storage. Even with the enhanced storage capabilities discussed herein, an upper threshold of usable space may eventually be met if the temporary files are not eventually purged.

FIG. 4 illustrates a method 100 for removing the temporary VCS repository 14. The process 100 begins with the application that created the temporary VCS repository 14 running on computer 11 (block 102). The computer 11 running the application may determine that the temporary storage needed in block 44 of FIG. 2 is no longer needed (block 104). In some embodiments, the computer 11 running the application may determine this by noticing that no clients are requesting access to the files and/or that no clients have requested access to the files for a certain threshold of time (e.g., 1 second, 1 minute, 1 hour, 1 day, etc.). Once the computer 11 running the application determines that the temporary storage is no longer needed, the computer 11 running the application may delete the repository (block 106). Typical VCS repositories are designed to be persistent, and thus, not easily removed. However, because the directory was created with a unique identifier (e.g. UUID), the computer 11 running the application may simply delete the entire temporary VCS repository 14 assigned that unique identifier. Thus, the temporary storage may be removed with relative ease, ensuring more efficient utilization of storage space.

Technical effects of the invention include a computer system that provides a temporary concurrent distribution of files to multiple clients requesting access to the files using a version control system (VCS). By using a VCS repository to store temporary files, enhanced file access may occur. For example, multiple clients may obtain access and modify a single file at a particular time. Further, less file corruption may occur because modifications by one client may not affect the other clients. Multiple versions of the temporary files may be saved, thus insuring that valuable modification data is not lost. Further, upon modification of the temporary files, the temporary VCS repository 14 may only store the actual file modifications rather than a complete version of the temporary files with the modified content, resulting in a reduction of used storage over a traditional shared folder system. Additionally, the temporary storage scheme described herein may increase performance by reducing file access locks when the temporary files are in use. Thus, multiple clients may access and/or modify the temporary files at once rather than needing to wait for a file to be unlocked.

This written description uses examples to disclose the invention, including the best mode, and also to allow any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A distributed computer system, comprising:
a plurality of distributed computers that are configured to communicate over a communications network, wherein one of the plurality of distributed computers is a host computer, the host computer comprising:
a processor; and
a storage comprising computer readable instructions that, when executed by the processor, cause the processor to perform operations comprising:
determining that a base version file has been or will be generated by a client computer of the plurality of distributed computers;
creating, in response to determining that the base version file has been or will be generated by the client computer of the plurality of distributed computers, a temporary storage space;
assigning the temporary storage space a unique identifier;
storing, in response to receiving the base version file from the client computer of the plurality of distributed computers, the base version file in the temporary storage space, wherein the temporary storage space is configured to allow concurrent access of the base version file by the plurality of distributed computers, wherein the temporary storage space is configured to store subsequent versions of the base version file;
determining an amount of time since any of the plurality of distributed computers have accessed or requested access to a file in the temporary storage space;
comparing the determined amount of time to a threshold amount of time; and deleting, when the determined amount of time is greater than the threshold amount of time, the temporary storage space based on the unique identifier.

2. The system of claim 1, the operations further comprising resolving a conflict in response to receiving from one of the plurality of distributed computers, at the temporary storage space, a first modified version;
wherein the first modified version is a version of the base version file that has been accessed and modified by the one of the plurality of distributed computers; and
wherein the conflict is resolved between the first modified version and a version of the base version file that is stored in the temporary storage space.

3. The system of claim 2, wherein the operation of resolving a conflict comprises at least one of:
storing the first modified version separate from a version of the base version file in the temporary storage space; and
merging the first modified version and a version of the base version file in the temporary storage space.

4. The system of claim 1, the operations further comprising registering, in response to receiving, at the temporary storage space, modifications to a version of the base version file, the modifications by storing at least one of:
the version of the base version file and the modifications to the version of the base version file; and
a new version of the version of the base version file based upon the modifications to the base version file.

5. The system of claim 1, wherein the base version file is generated by an application running on the client computer of the plurality of distributed computers.

6. The system of claim 5, wherein the amount of time is calculated in response to one of the plurality of distributed computers running the application.

7. The system of claim 1, wherein the temporary storage space is a file directory.

8. The system of claim 1, wherein the unique identifier comprises a universal unique identifier (UUID).

9. The system of claim 1, wherein the base version file is the first file to be stored in the temporary storage space.

10. A method, comprising:
determining automatically, via a host computer of a plurality of distributed computers that are configured to communicate over a communications network, that a base version file has been or will be generated by a client computer of the plurality of distributed computers,
creating automatically, via the host computer, a temporary storage space in response to determining that the base version file has been or will be generated by the client computer of the plurality of distributed computers;
assigning, by the host computer, the temporary storage space a unique identifier;
storing, by the host computer, in response to receiving the base version file from the client computer, the base version file in the temporary storage space, wherein the temporary storage space is configured to automatically allow concurrent access to the base version file by the plurality of distributed computers, wherein the temporary storage space is configured to store subsequent versions of the base version file;
determining an amount of time since any of the plurality of distributed computers have accessed or requested access to a file in the temporary storage space;
comparing the determined amount of time to a threshold amount of time; and deleting
automatically, via the host computer, the temporary storage space based on the unique identifier in response to determining that the determined amount of time is greater than the threshold amount of time.

11. The method of claim 10, creating the temporary storage space comprising:
generating a file directory;
assigning the file directory the unique identifier; and
configuring the file directory as a version control system repository.

12. The method of claim 11, wherein the unique identifier comprises a universal unique identifier (UUID).

13. The method of claim 10, wherein the base version file is generated by an application running on the client computer.

14. A non-transitory computer readable medium, comprising computer-readable instructions that, when executed by a processor, cause the processor to perform operations comprising:
determining that a base version file has been or will be generated by a client computer of a plurality of distributed computers, wherein the plurality of computers are distributed computers that are configured to communicate over a communications network;
creating, in response to determining that a base version file has been or will be generated by the client computer of the plurality of distributed computers, a temporary storage space;
identifying the temporary storage space by a unique identifier;
storing, in response to receiving the base version file from the one of the plurality of distributed computers, the base version file in the temporary storage space, wherein the temporary storage space is configured to allow concurrent access of the base version file by the plurality of distributed computers, wherein the temporary storage space is configured to store subsequent versions of the base version file;
determining an amount of time since any of the plurality of distributed computers have accessed or requested access to a file in the temporary storage space;
comparing the determined amount of time to a threshold amount of time; and deleting, when
the determined amount of time is greater than a threshold amount of time, the temporary storage space based on the unique identifier.

* * * * *